United States Patent [19]

Hunder et al.

[11] 4,326,735
[45] Apr. 27, 1982

[54] MOLD USEFUL IN SEALING LEAKS IN PIPES

[75] Inventors: David N. Hunder, Woodbury; Harold C. Hervig, Jr., Maplewood, both of Minn.

[73] Assignee: Minnesota Mining & Manufacturing Company, Saint Paul, Minn.

[21] Appl. No.: 196,390

[22] Filed: Oct. 14, 1980

[51] Int. Cl.³ .............................................. F16L 55/18
[52] U.S. Cl. ....................................... 285/15; 264/32; 285/293; 285/294; 425/13; 249/89
[58] Field of Search ........................... 285/15, 293, 294; 138/97, 99; 264/31, 32, 36; 249/89, 100; 425/13, 256, 812, DIG. 242

[56] References Cited

U.S. PATENT DOCUMENTS

| | | | |
|---|---|---|---|
| 2,766,614 | 10/1956 | Cook | 285/13 X |
| 3,141,478 | 7/1964 | Copeland | 285/294 X |
| 3,178,793 | 4/1965 | Rosengarten et al. | 138/97 X |
| 3,368,005 | 2/1968 | Bulzula et al. | 285/15 X |
| 3,770,301 | 11/1973 | Adams | 285/294 |
| 4,053,176 | 10/1977 | Hilbush | 285/15 X |

FOREIGN PATENT DOCUMENTS

| | | | |
|---|---|---|---|
| 1165335 | 10/1964 | United Kingdom | 285/15 |
| 1565953 | 4/1980 | United Kingdom | 285/294 |

Primary Examiner—Dave W. Arola
Attorney, Agent, or Firm—Cruzan Alexander; Donald M. Sell; James V. Lilly

[57] ABSTRACT

The present invention is directed to an article and processes for repairing fluid (e.g., liquid and gas) leaks in pipes, including, for example, bell and spigot joints.

The device and process of the invention incorporates an elastomeric sleeve that extends around the pipe and longitudinally to either side of the leak. The sleeve contains a resin injection port with means to prevent escape of resin at a pressure above a predetermined pressure, and a fluid venting port with pressure-relief means to permit the escape of fluid at a predetermined pressure above the pressure in the pipe to be repaired.

11 Claims, 9 Drawing Figures

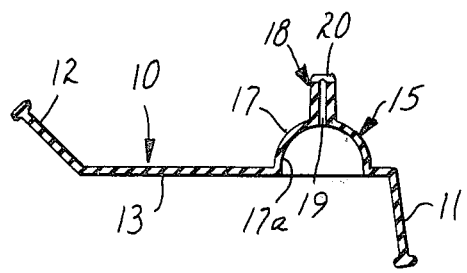
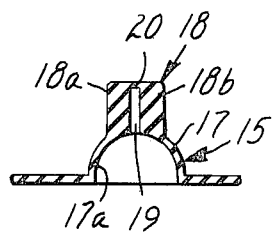
FIG. 4    FIG. 5
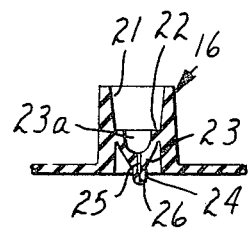
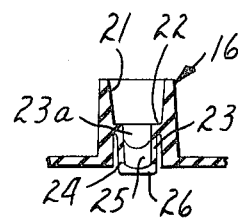
FIG. 6    FIG. 7
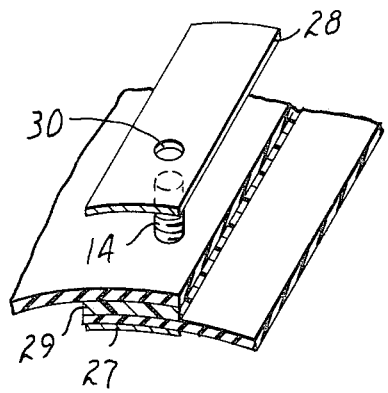
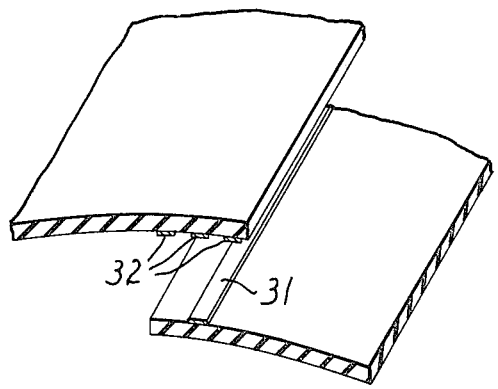
FIG. 8    FIG. 9

4,326,735

MOLD USEFUL IN SEALING LEAKS IN PIPES

TECHNICAL FIELD

The present invention is directed to articles and processes useful in repairing fluid (i.e., liquid and gas) leaks in pipes. As it is used throughout the specification, the term "pipes" includes lengths of pipe, pipe joints, valves, fittings, etc. More particularly, the invention is directed to a flexible mold that permits the repair of said leaks rapidly and economically without requiring that the flow of fluid in the pipe be stopped during repair.

BACKGROUND ART

Various devices for repairing fluid leaks, particularly natural gas leaks, in various portions of pipes are known. U.S. Pat. No. 3,368,005 describes a device useful for repairing leaks in bell and spigot pipe joints. The device is wrapped around the joint and a sealant is injected into the cavity between the joint and the device. Gas in the cavity is said to be able to escape through a flap located where the two ends of the device overlap. The flap, however, prevents escape of sealant.

In order to determine when the cavity is full of sealant, some technique must be employed to monitor the pressure therein. Thus, for example, a pressure gauge may be utilized. Alternatively, the difficulty in pumping additional sealant into the cavity may be observed. Neither of these techniques is entirely satisfactory as they may give false indications of the amount of resin in the cavity.

Another such device is disclosed in U.S. Pat. No. 4,053,176. This device employs an inlet tube, a baffle or dam by the inlet tube, and a vent. The inlet tube is biased so that incoming sealant is steered in a desired direction. The baffle is placed in the direction of sealant flow to distribute the sealant across the width of the cavity to be filled. The inlet tube and the vent are located such that when the device is placed around the pipe joint, the inlet tube is located at or near the bottom of the joint and the vent is located at or near the top of the joint.

Locating the inlet in this manner is not satisfactory as it is difficult to reach and inject sealant therein. Moreover, no means is provided to prevent escape of unhardened sealant from the inlet. Consequently, it is necessary to insert some type of plug in it in order to prevent loss of sealant. This is cumbersome to do. Still further, the vent is open to the atmosphere and has no means to permit escape of sealant therefrom above a predetermined pressure. Conversely, it has no means to prevent escape below that predetermined pressure.

DISCLOSURE OF THE INVENTION

The present invention overcomes these disadvantages. It provides a mold useful in sealing fluid leaks in pipes. The mold comprises:

a sleeve of an elastomeric material dimensioned to fit around a pipe and extend longitudinally to both sides of a leak, said sleeve having a resin injection port and a fluid venting port located such that, when said mold is extended around said pipe and longitudinally to both sides of said leak, said fluid venting port is at the top of said pipe, means for securing said mold to itself after being placed around said pipe, pressure-relief means on said fluid venting port to permit escape of fluid at a predetermined pressure above the pressure in said pipe, sealing means on said injection port to prevent escape of resin at a pressure above said predetermined pressure, said mold being at least in part expandable under a pressure less than said predetermined pressure.

For purposes of convenience this disclosure, including the accompanying drawings, makes frequent reference to leaks at bell and spigot pipe joints. However, as noted above, the mold of the invention may be used to repair fluid leaks in other types of pipes.

BRIEF DESCRIPTION OF THE DRAWINGS

The present invention will be further understood with reference to the accompanying drawings wherein like reference characters refer to the same elements throughout the several views and wherein:

FIG. 4 is a cross-sectional view of the mold of FIG. 1 along line 4—4 and showing a cross-sectional view of a preferred fluid venting port;

FIG. 5 is a cross-sectional view of the preferred fluid venting port of the invention taken along line 5—5 of FIG. 1;

FIG. 6 is a cross-sectional view of a preferred resin injection port of the invention take along line 6—6 of FIG. 1;

FIG. 7 is a cross-sectional view of the preferred resin injection port of the mold of the invention taken along line 7—7 of FIG. 1;

FIG. 8 is a sectional detail view of a preferred means for securing the mold of the invention to itself; and FIG. 9 is a sectional detail view of an alternative means for securing the mold of the invention to itself.

DETAILED DESCRIPTION

Figure 2:
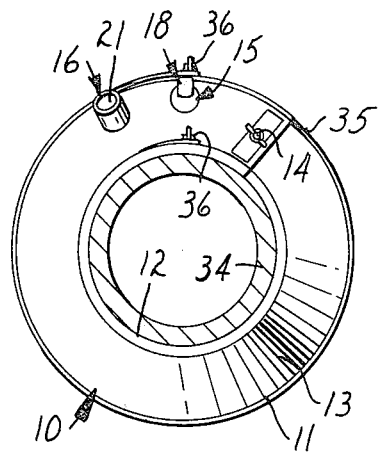
FIG. 2 is a top view of the mold of FIG. 1 in an assembled state.

The mold of the present invention is comprised of an elastomeric material, preferably reinforced with fabric. A number of elastomers may be utilized in the mold. They include styrene/butadiene rubber, ethylene/propylene/diamine monomer, cast urethane, neoprene, etc. Standard processing techniques, e.g., rubber molding, may be utilized to manufacture the mold.

Although the mold is primarily intended to be utilized in connection with pipes of generally circular cross section, it may also be used with pipes of other cross section. Moreover, the mold is preferably split, see for example FIG. 1, and may be designed to fit around any size pipe.

The resin injection port, with its associated sealing means, and the fluid venting port, with its associated pressure-relief means, are significant aspects of the present invention. The injection port and sealing means permit injection of resin into the mold but prevent escape of the resin from the mold before it has hardened. The venting port, on the other hand, does not permit the escape of material until a predetermined pressure has been obtained. The details of these elements of the invention will be discussed more fully hereinafter with reference to the drawings.

The mold of the present invention may be readily employed to repair fluid leaks (such as gas leaks) in pipes. Thus, a pipe to be repaired is located and any earth or other material therearound is removed so that all sides of the pipe may be reached. The pipe is preferably then cleaned by, for example, sand blasting, grit blasting, wheat blasting, and refractory blasting. Alternatively, the pipe may be cleaned by wire brushing, or scraping.

The mold is then placed around the pipe so that it circumscribes the pipe and so that the fluid venting port is at as high a point as possible on the pipe. The mold is then attached to itself and secured to the pipe to be repaired.

After being secured to the pipe, resin is injected into the annulus between the mold and the pipe. As the resin fills the annulus, the pressure therein builds until it exceeds the line pressure of the fluid in the pipe stopping the leak. As additional resin is injected into the annulus, the pressure therein increases until it exceeds the predetermined pressure of the pressure relief means, opening said means and permitting any fluid (e.g., gas) in the annulus to escape. When the annulus is substantially filled with resin, a small amount of resin will escape from the fluid venting port through the pressure-relief means. At this point injection of resin is discontinued. Resin will continue to escape from the fluid venting port until the pressure in the annulus is equal to or less than the pressure at which pressure-relief means opens.

Once the annulus is substantially filled with resin, the resin is allowed to harden and form a rigid seal around the pipe.

The resin utilized to repair the leak may be selected from a number of commercially available materials. An example of such a resin is Scotchcast ® 2130, available from the 3M Company.

Refering to the drawings, FIGS. 1-4, show a mold 10 that represents a preferred embodiment of the invention that is well suited for repairing fluid leaks in bell and spigot pipe joints. Mold 10 comprises a sleeve of elastomeric material having a bell-enclosing portion 11, a spigot-enclosing portion 12, a connecting portion 13 joining bell-enclosing portion 11 and spigot-enclosing portion 12, a securing means 14 for fastening mold 10 to itself after it has been placed around the joint, a fluid venting port 15, and a resin injection port 16. Also shown is an opening 14a through mold 10 for cooperating with securing means 14.

As can be seen, particularly with reference to FIG. 4, preferred mold 10 has a unitary, stepped construction. In this construction bell-enclosing portion 11 and spigot-enclosing portion 12 project in opposite directions from the horizontal plane of connecting portion 13. This gives the cross section of mold 10 a generally "S" shape that facilitates its assembly around a bell and spigot pipe joint.

FIGS. 4 and 5 show the details of a preferred fluid venting port 15 of the invention. In this embodiment, fluid venting port 15 comprises a shoulder 17 having a generally dome shape, and a head 18. Shoulder 17 projects upwardly from the mold and defines a generally dome shaped cavity 17a.

Head 18 has a narrow opening 19 that extends from cavity 17a substantially all of the way through head 18. Slit 20 connects opening 19 to the outside of head 18. Head 18 preferably has a thin rectangular box-like shape whose height is greater than its width which in turn is greater than its thickness.

Slit 20 preferably is through the narrowest dimension of head 18, that it is at right angles to the width of the head. Slit 20, in conjunction with solid portions 18a and 18b of head 18, act as the pressure relief means of the invention. Normally, slit 20 is closed and prevents escape of fluid. However, when the pressure in the cavity between the mold and the pipe exceeds the predetermined pressure, typically one slightly above that of the fluid in the pipe, slit 20 opens and permits escape of fluid. The mass or the flexibility of the material making up halves 18a and 18b can be varied so as to control the pressure at which slit 29 will open.

The pressure relief means may also be provided in other ways. Thus, for example, a spring mechanism designed to be forced open above the predetermined pressure, may be attached to venting part 15, typically along its width. An example of a useful spring mechanism is a spring clamp.

FIGS. 6 and 7 show the details of the resin injection port 16. Port 16 comprises a upwardly projecting hollow cylinder having a nozzle-receiving cavity 21. Nozzle-receiving cavity 21 terminates in an annular ridge 22. Connecting with nozzle-receiving cavity 21 is an intermediate portion 23 which defines a rounded cavity 23a. Cavity 23a communicates with cavity 21. A generally rectangular terminal portion 24 is attached to intermediate portion 23. Terminal portion 24 has a slot 25 that extends from rounded cavity 23a substantially all of the way through terminal portion 25. Terminal slit 26 connects slot 25 to the inside of resin injection port 16. Preferably slit 26 goes through terminal portion 25 along its width.

Slit 26 and intermediate portion 23 together comprise the preferred sealing means of injection port 16. While resin is injected into the annulus between the mold and the pipe, slit 26 is open. Once injection is discontinued the pressure in the annulus pushes against intermediate portion 23 causing it to flex inwardly and close slit 26. The slit remains closed until the pressure in the annulus is exceeded by the injection of additional resin.

FIG. 8 shows one means for attaching the mold of the invention to itself after the mold has been placed around a leaking pipe. The preferred fastening means comprises a first rigid plate 27 secured to a bottom of one end of the mold, a second rigid plate 28 which is placed over the top of the opposite end of the mold, securing means 14, here a threaded post, and a nut (not shown). The post passes through plate 27, both ends of the mold and plate 28. Openings 30 are provided through plates 27 and 28 and both ends of the mold to permit passage of securing means 14. A layer of a mastic sealant 29 is preferably placed between the overlapping ends of the mold.

Figure 1:
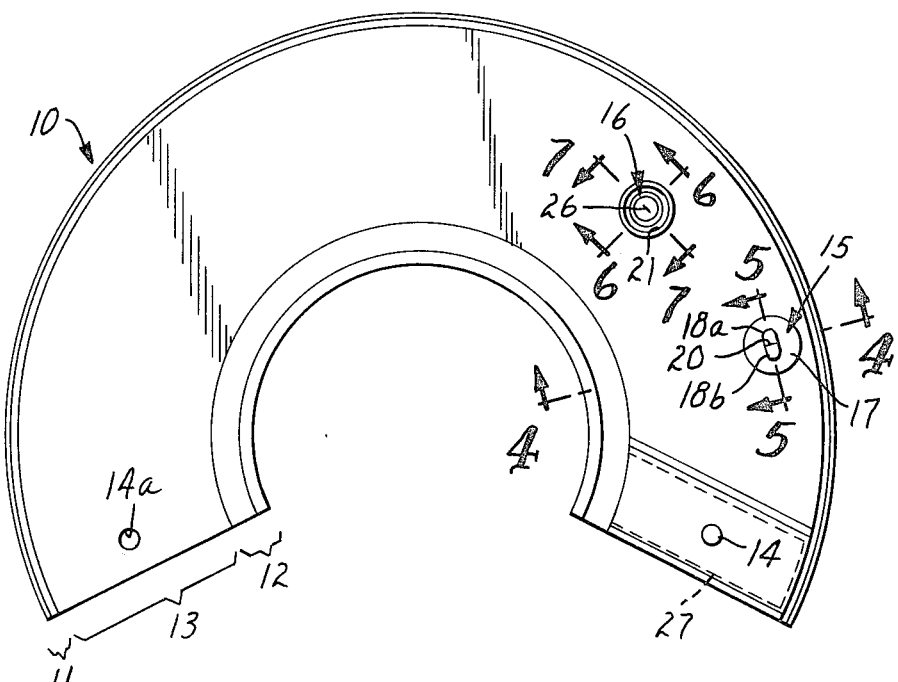
FIG. 1 is a top view of one embodiment of the invention in an unassembled state.

When the mold employed is that of FIG. 1, the mastic 29 and plates 27 and 28 need extend only across portion 13 of the mold.

FIG. 9 shows an alternative means of securing the mold to itself. In this embodiment a strip of a fastening means 31 is placed on the top of one end of the mold and one or more cooperating strips of a fastening means 32 are attached to the bottom of the other end of the mold. When strips 31 and 32 are mated together, they fasten the mold to itself. Providing more than one strip 32 enables a repairman to adjust the mold to accomodate the pipe joint if necessary. Examples of useful fastening means for this embodiment include strips of pressure sensitive adhesive tape, and strips of cooperating mechanical fasteners such as HOOK 'N LOOP ® fasteners available from 3M Company, or Velcro ® fasteners available from the Velcro Corporation.

Figure 3:
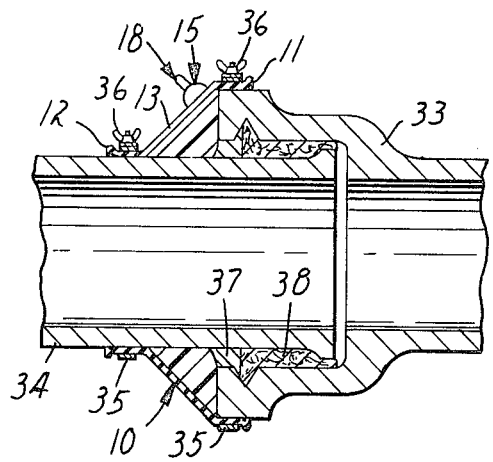
FIG. 3 is a longitudinal view in section of a repaired bell and spigot pipe joint.

FIG. 3 illustrates the mold of FIG. 1 being used to repair a leak in a bell and spigot pipe joint. The joint comprises bell 33, spigot 34, and a head seal comprising lead 37 and jute 38. As can be seen, the mold has been placed around the pipe so that bell-enclosing portion 11 circumscribes bell 33, and spigot-enclosing portion 12 circumscribes spigot 34 and fluid venting port 15 is at as high a point as possible around the joint. Mold 10 is then attached to itself as has been described with reference to FIG. 1. Mold 10 is then secured to bell and spigot portions 33 and 34 of the joint by straps 35 and nuts 36. Ring clamps and nuts are shown in FIG. 3 for this purpose. Other techniques, such as taping or tying, may be employed to fasten the mold to the bell and spigot portions of the joint.

The preferred stepped construction of the mold facilitates its application to a bell and spigot pipe joint. Thus, the bell-enclosing and spigot-enclosing portions are angled away from the connecting portion so that the mold can be applied without having to bend or excessively stretch the mold.

What is claimed is:

1. A mold useful in sealing fluid leaks in pipes, said mold comprising:
   a sleeve of an elastomeric material dimensioned to fit around a pipe, and extend longitudinally to both sides of a leak in a pipe, said sleeve having a resin injection port and a fluid venting port located such that, when said mold is extended around said pipe and longitudinally to both sides of said leak, said fluid venting port is at the top of said pipe,
   means for securing said mold to itself after being placed around said pipe,
   pressure-relief means on said fluid venting port to permit escape of fluid at a predetermined pressure above the pressure in said pipe,
   sealing means on said injection port to prevent escape of resin at a pressure above said predetermined pressure,
   said mold being at least in part expandable under a pressure less than said predetermined pressure.

2. A mold according to claim 1 wherein said fluid venting port comprises an upwardly projecting, generally dome-shaped shoulder that defines a generally dome-shaped cavity thereunder, a head on said shoulder having a narrow passage therein that extends from said dome-shaped cavity substantially all of the way through said head and a fluid venting slit in said head that connects said passage to the outside of said head and wherein said pressure relief means includes said fluid venting slit.

3. A mold according to claim 2 wherein said resin injection port comprises an upwardly projecting hollow cylinder having a nozzle-receiving cavity open to the outside of said mold and, terminating in an annular ridge, an intermediate portion having a rounded cavity that communicates with said nozzle-receiving cavity, a generally rectangular terminal portion having a slot that extends substantially all of the way therethrough that communicates with said rounded cavity, and a terminal slit in said terminal portion that connects said slot to the inside of said resin injection port and wherein said sealing means includes said terminal slit.

4. A mold according to claim 3 wherein said head of said fluid venting port comprises a thin, rectangular, box-like structure whose height is greater than its width which is in turn greater than its thickness.

5. A mold according to claim 4 wherein said fluid venting slit is through said head parallel to the thickness and perpendicular to the width of said head.

6. A mold according to claim 5 wherein said sleeve comprises a unitary, stepped element having a bell-enclosing portion, a spigot-enclosing portion, and a connecting portion joining said bell-enclosing and spigot-enclosing portions.

7. A mold according to claim 6 wherein said spigot-enclosing portion projects upwardly from the plane of said connecting portion and wherein said bell-enclosing portion projects downwardly from the plane of said connecting portion.

8. A unitary, stepped mold useful in sealing leaks in bell and spigot joints in gas pipes, said mold comprising a sleeve of an elastomeric material dimensioned to fit around, and extend longitudinally to both sides of, a bell and spigot pipe joint, said sleeve having
   a bell-enclosing portion, a spigot-enclosing portion, and a connecting portion joining said bell-enclosing and spigot-enclosing portions, said spigot-enclosing portion projecting upwardly from the plane of said connecting portion and said bell-enclosing portion projecting downwardly from the plane of said connecting portion;
   securing means on said connecting portion for fastening said mold to itself;
   a fluid venting port on said connecting portion adjacent the juncture of said bell-enclosing and connecting portions, said fluid venting port having pressure relief means to permit escape of fluid at a predetermined pressure above the pressure in said pipe;
   a resin injection port on said connecting portion a distance no closer to the intersection of said bell-enclosing and connecting portions than is said fluid venting port, said fluid injection port having means to prevent escape of resin at a pressure above said predetermined pressure.

9. A mold according to claim 1 wherein said sleeve is reinforced with fabric.

10. A mold according to claim 1 wherein said securing means includes a first rigid plate on the bottom and adjacent the end of said mold, a layer of mastic sealant on the top of and adjacent the same end of said mold as is said first plate, and a threaded post through said first rigid plate said mastic and said mold.

11. A method of sealing a fluid leak in a pipe comprising the steps of
   providing a mold comprising (a) a sleeve of an elastomeric material dimensioned to fit around, and to extend longitudinally to both sides of, a pipe, said sleeve being formed with a resin injection port, and a fluid venting port; (b) means for securing said mold to itself after being placed around said pipe; (c) pressure-relief means on said fluid venting port to permit escape of fluid at a predetermined pressure above the pressure in a said pipe; and (d) sealing means on said injection port to prevent escape of a resin at a pressure above said predetermined pressure, said mold being at least in part expandable under a pressure less than said predetermined pressure;
   placing said mold around said pipe joint so that said mold extends longitudinally to both sides of said joint, and so that said fluid venting port is at the highest point around said joint;
   securing said mold to itself and to said pipe;
   injecting resin into the annulus between said mold and said pipe through said resin injection port until said annulus is substantially filled and the pressure in said annulus exceeds the pressure in said pipe, thereby forcing substantially all fluid out of said annulus through said pressure-relief means; and
   allowing said resin to harden.

* * * * *